United States Patent [19]

Awaji

[11] Patent Number: 5,562,758
[45] Date of Patent: Oct. 8, 1996

[54] METHOD OF REMOVING FINE PARTICLE DUST AND APPARATUS THEREFOR

[76] Inventor: Toshio Awaji, 130-4, Hikino-cho 2-cho, Sakai-shi, Osaka, Japan

[21] Appl. No.: 393,791

[22] Filed: Feb. 24, 1995

[51] Int. Cl.⁶ .......................... B01D 46/04; B01D 45/12; B01D 45/18
[52] U.S. Cl. ................. 95/282; 95/270; 55/259; 55/300; 55/257.4; 55/317
[58] Field of Search .......................... 95/268, 269, 270, 95/282; 55/257.4, 259, 300, 317, 401

[56] References Cited

U.S. PATENT DOCUMENTS

| | | | |
|---|---|---|---|
| 4,133,657 | 1/1979 | Krogsrud | 55/290 |
| 4,528,008 | 7/1985 | Takagi et al. | 55/485 |
| 4,576,618 | 3/1986 | Wooldridge et al. | 55/259 |
| 4,666,473 | 5/1987 | Gerdau | 95/268 |
| 4,999,036 | 3/1991 | Hwang et al. | 55/317 |
| 5,158,585 | 10/1992 | Saho et al. | 55/338 |
| 5,180,405 | 1/1993 | Kuan | 55/259 |
| 5,181,943 | 1/1993 | Weber | 95/268 |

*Primary Examiner*—Robert Warden
*Assistant Examiner*—Theresa T. Snider
*Attorney, Agent, or Firm*—Edwin E. Greigg; Ronald E. Greigg

[57] ABSTRACT

A method and apparatus for separating and collecting fine dust particles from a gas including the fine particle dust from a source which generates the fine particle dust by introducing the gas to a filter. The method further sets forth the step of flowing the gas from the inside of the filter of a dust collector of cylindrical form to the outside thereof so as to filter the gas after removing an oil and water from the gas by use of a rotary brush prior to introduction of the gas to the dust collector.

35 Claims, 5 Drawing Sheets

METHOD OF REMOVING FINE PARTICLE DUST AND APPARATUS THEREFOR

BACKGROUND OF THE INVENTION (1) Field of the invention.

The present invention relates to a method and apparatus for catching and removing fine particle dust produced from a source from which fine particle dust is generated, and particularly to a method and apparatus for effectively catching and removing fine particle dust having a diameter of less than about 0.3 µm, which is produced in a process of manufacturing semiconductor elements, and for attempting compactness and miniaturization of the apparatus.

(2) Prior Art

Fine particle dust is generated in a source which belongs to a semiconductor element producing method, automobile manufacturing, plastics manufacture, resources manufacture, ceramics manufacture, powder metallurgy manufacture, cleanser industry, catalyzer manufacture, ferrite manufacture, color material industry, agricultural chemical industry, fertilizer industry, food industry, waste treating industry, bio-chemical industry, cosmetic industry, or medical and pharmaceutical industry.

It is known that very fine particle dust having a diameter of about 0.01–50 µm is produced in such a source of generating the dust.

Recently, computers and electric control devices utilizing the computers have progressed remarkably, and development of these industries have expanded widely and infinitely. Now, a technique in manufacturing semiconductors takes an important position as electronic parts especially those used for a computer, and also the amount of semiconductor production is growing remarkably and rapidly.

Germanium (Ge) and silicon (Si) are normally used as raw materials for semiconductor elements, and as a special semiconductor element, gallium-arsenide (GaAs) and gallium-phosphorus (GAP) and the like are also practiced.

It is well known that fine particle dust generated in the process of manufacturing semiconductor elements is itself harmful in a viewpoint of a public nuisance, which is prohibited to be discharged into the atmosphere, and that the gas including the fine particle dust is itself harmful. Further, it is also well known that the dust adsorbed is a harmful product if released in a gas.

The harmful products generated or used in the semiconductor manufacturing are silicon, arsenic, phosphorus, boron, metallic hydrogen, fluorine, halogen, halide, nitrogen oxides and the like.

Nowadays, one's mind of preventing a public nuisance is thoroughly permeated. In such a state, to directly discharge the exhaust gas including the above harmful components or fine particle dust into the air is not acceptable, and first of all it is required to remove the particle dust from the exhaust gas and give it suitable treatments so as to change the harmful gas to a safe and clean gas.

Then, it is proposed that to remove particle dust from an exhaust gas or the like, the prior art has been using a cyclone, a scrubber, a venturi scrubber, a bag filter, an electric collector, a looper and a settler.

However, the function for catching the particle dust is limited. In the case of the cyclone, the diameter of the particle dust is more than 3.0 µm, and in the scrubber is 1.0 µm. In the case of the venturi scrubber, bag filter, and electric collector, the diameter is more than 0.1 µm. Also, in the looper is 10 µm and the setter is 50 µm. It is a known fact that these conventional devices cannot filter out the fine particle dust having a diameter of 0.01 µm–50 µm.

The venturi scrubber, bag filter, and electric collector may filter out the fine particle dust having a diameter of 0.1 µm, but these apparatus are big and expensive and troublesome in disposal of the waste of the filtered dust.

When actually checking distribution of the diameter of the fine particle dust, which is produced in the process of manufacturing semiconductor elements, it has particles less than about 0.3 µm. Therefore, it has been tried repeatedly to develop an apparatus which may filter dust particles of less than about 0.3 µm from a gas. Through the development, it has been found that dust particles of less than about 0.3 µm may be collected sufficiently by using a filter which comprises a non-woven cloth of felt having a thickness of 1.5 mm.

Then, it was tried to wash the filter with a high pressure fluid against the flow of the gas so as to reuse the filter. However, since the filter has a very small mesh, a relatively high pressure fluid must be used for cleaning the filter. As a result, it necessitates a cleaning apparatus of big and high ability and requires a broad area for its installation. Also, the apparatus becomes very expensive and its maintenance cost increases.

Therefore, as shown in FIG. 5, it is proposed a self-reclaiming dust collector which comprises a filter 101 formed cylindrically to have a vertical axis, a brush 102 disposed rotatably and in contact with the inner periphery of the filter 101, so as to introduce the gas to an end of the brush 102 while rotating the brush 102, and a flow of the gas through the center of the brush 102 via the hollow portion of the filter 101 toward the outside, and then the dust stuck to the filter 101 is brushed off by rotating the brush 102.

However, when the self-reclaiming dust collector is used as the fine particle dust collector in the actual process of manufacturing semiconductor elements, a pressure loss of the filter 101 becomes great within a short period of time which is a shorter time than the anticipated period, and moreover it was found that the filter cannot be reclaimed even if the brush 102 is rotated.

Then, the inventor further researched and found that the acceleration of blockage of the filter was bought on by the following fact. Namely, the gas or air including the fine particle dust produced in the process of manufacturing semiconductor elements, included liquids such as an oil that has leaked from a vacuum pump or an oil or water used for polishing or cutting. The liquids were floating in the state of very small fine mist, and once stuck to the inside wall of a duct while the gas flowed in the duct and separated therefrom due to the flow of the gas and then transferred to the filter 101, so that the liquids adhered to the laminated filter together with the fine particle dust to cause a blockage of the filter 101. Further, the liquids absorbed the fine particle dust floating around the filter 101 and blocked the mesh of the filter 101.

Furthermore, the oil and water that adhered to the surface of the filter 101 permeated into the mesh of the filter 101 according to the pressure of the gas and capillarity and pooled therein. When these adhered to the surface of the filter 101 together with the fine particle dust, it was very difficult to remove those from the filter 101 by scraping the same with the brush 102. As the result, it was confirmed that the filter was blocked and not reclaimed.

SUMMARY OF THE INVENTION

The present invention has been achieved in view of the technical subject matter, and has an object to provide a method of removing fine particle dust and an apparatus therefor, for effectively filtering fine particle dust having a diameter of less than about 0.3 μm, which is produced particularly in the process of manufacturing semiconductor elements, and for attempting compactness and miniaturization of the apparatus.

By the way, in this specification, the present invention means the method of removing the fine particle dust and the apparatus therefor.

First, the method of removing the fine particle dust according to the present invention will be described below.

To achieve the above object, in the method of separating and collecting fine particle dust from a gas including the fine particle dust from a source that generates the fine particle dust by introducing the gas to a filter, said method comprises the step of directing the gas from the inside of the filter of a dust collector of cylindrical form to the outside thereof so as to filter the gas after removing an oil and water from the gas prior to introduction of the gas to the dust collector.

In the method, as a dust removing device, the device may have a construction which is rotatable at a fixed position or movable in a right and left or up and down direction while contacting the interior of the filter of the dust collector, so that the interior of the filter may be cleaned to remove and collect the dust caught by the filter.

In this case, the dust removing device may be movable at any time intermittently or continuously.

By the way, the dust removing device is sufficient to be able to remove the fine particle dust and not limited particularly thereto. In detail, it may, for example, use a rotary brush or a pallet for removing the dust.

Considering the above fact, in the method of separating and collecting fine particle dust from the gas including the fine particle dust from the source which generates fine particle dust by introducing the gas to the filter, and directing the gas from the inside of the filter of the dust collector of cylindrical form to the outside thereof so as to filter the gas after removing the oil and water from the gas prior to introduction of the gas to the dust collector, it is preferable to scrape off the dust which is caught by the inner peripheral surface of the filter, and brushing off the dust caught between the bristles of the brush.

In the method of the invention, it is possible to direct the gas including the fine particle dust from the source of generating the same, from the underside of a liquid separation rotary brush which is rotated laterally, to the upper side of the liquid separation rotary brush so as to catch any oil and water between the bristles of the liquid separation rotary brush, transferring the oil and water, which are caught by the liquid separation rotary brush to the inner peripheral wall of a liquid separation chamber which is arranged around the liquid separation rotary brush by utilizing a centrifugal force, dropping the oil and water along the inner peripheral wall of the liquid separation chamber to a pool of the same at the bottom of the liquid separation chamber, and introducing the gas which passes above the liquid separation rotary brush to the dust collector.

Further, in the method of the invention, it is possible to absorb the separated oil and water with a laminated member which is disposed at the bottom of the liquid separation chamber and made of a water-absorbing polymer, an oil-absorbing polymer or a combination thereof, so as to dispose of the oil and water together with the polymer.

According to the method of the invention, it is preferable to drop the fine particle dust falling from the dust collector to the liquid separation chamber so as to collect in a pool in the bottom of the liquid separation chamber and then to dispose of the same.

The method of the invention effectively removes fine particle dust from the source which generates the dust, but it is also used in an installation that generates fine particle dust in the process of manufacturing semiconductor elements, and equipment required for the installation.

Next, the apparatus for removing the fine particle dust according to the invention will be described hereinafter.

According to the invention, to achieve the above objects, in the apparatus which provides a dust collector for removing fine particle dust from a gas including the fine particle dust introduced from a source that generates the fine particle dust, said apparatus comprises a liquid separation device which removes the oil and water from the gas prior to introducing the gas into the dust collector from the source which generates the fine particle dust, said dust collector being provided with a cylindrically shaped cleaning chamber formed around the filter, a box-like body having an introducing inlet which surrounds the filter and the cleaning chamber and introducing the gas into the liquid separation chamber from an opening of the filter, and an introducing outlet for communicating the cleaning chamber with the outside, a particle dust removing device rotatable in contact with the inner wall of the filter, and a driving device for driving the particle dust removing device.

In the apparatus of the invention, the liquid separation device includes a liquid separation rotary brush. It is advantageous that the liquid separation rotary brush is formed in a disc or spiral shape since its construction is simple and it is easy to separate the oil and water.

In the invention, where the liquid separation rotary brush is formed in a spiral shape, the brush may be formed continuously or intermittently to form a spiral along the length.

As the liquid separation rotary brush, it is sufficient to have a construction that may separate the oil and water by rotation, and not limited particularly. For example, water and oil may be separated by a disc, a spiral, and or any type of shapes. The liquid separation rotary brush may be rotated at a fixed position, or constructed to be movable right and left or up and down.

It is possible to provide a blower which generates a flow from the source of generating the fine particle dust to the outside via the dust collector.

Further, in the apparatus, the liquid separation device may include a cylindrically shaped liquid separation chamber which has a vertical axis, a box-like body having an inlet formed in the lower portion of the liquid separation chamber for introducing the gas from the source that generates the fine particle dust, and having an outlet formed in the upper portion of the liquid separation chamber for discharging the gas to the dust collector, a liquid separation rotary brush in a disc or spiral shape arranged between the inlet and the outlet of the liquid separation chamber to be rotatable about a vertical axis, and a driving device for driving the liquid separation rotary brush.

Furthermore, if desired, the apparatus may include a laminated member at the bottom of the liquid separation chamber, which member is made of a water-absorbing polymer, an oil-absorbing polymer or a combination thereof.

Where the lower portion of the liquid separation chamber is formed to be disassembled from the lower portion of the upper portion thereof, it is easily separated from the liquid separation chamber so that its maintenance can be easily carried out.

In the method, to effectively remove the fine particle dust, it is advantageous to construct the filter as follows. Namely, the dust removing device of the dust collector comprises a dust removing rotary brush which comprises a spiral brush having bristles forming a spiral surface about a central axis positioned on an axis of the filter of the dust collector, where the spiral brush is rotated by a driving device of the dust collector.

Where the dust removing rotary brush is formed in a spiral shape, the brush may be formed continuously or intermittently to form a spiral.

Further, it is advantageous to construct the dust removing device of the dust collector such that the device comprises a central axis positioned on an axis of the filter of the dust collector and bristles set to the central axis, so that the bristles may contact the inner wall of the filter and remove the dust from the filter by rotation of the bristles.

Furthermore, the introducing inlet of the dust collector is arranged above the liquid separation chamber and formed to serve as an outlet of the liquid separation device. This arrangement is preferable since it is simple in construction and easy in treatment.

It is preferable that the filter of the dust collector comprises a laminated filter having at least three filters each of which has a smaller mesh from the inside to the outside thereof in order of the mesh, since such a laminated filter may effectively remove the fine particle dust after the coarser dust.

In order to effectively remove fine particle dust for a long period of time, it is preferable to use a laminated filter which comprises a first layer filter having a mesh of about 200 μm, a second layer filter having a mesh of 50≈200 μm, and a third layer filter having a mesh less than the second layer filter but greater than 1 μm.

It is preferable that the thickness of the laminated filter is more than 5 mm and the thickness of the first layer filter shares 20–50% of the thickness of the laminated filter. Also, the thickness of the second layer filter shares 30–60% of the thickness of the laminated filter and the thickness of the third layer filter shares 1–25%.

In the invention, the apparatus is used to effectively remove fine particle dust from the source which generates the fine particle dust, but it is particularly used in an installation which generates a very fine particle dust and its auxiliary installation therefor which are used in the process of manufacturing semiconductor elements.

Function

According to the invention, the gas including the fine particle dust from the source which generates dust is introduced to the liquid and oil and water are separated therein and then the fine particles are introduced to the dust collector. Therefore, one can be assured that the oil and water or the dust absorbed in the oil and water are adhered to the surface of the filter, and that the filter is prevented from clogging due to the oil and water in the gas.

Further, the oil and water are not permeated into and left in the filter of the dust collector. Therefore, it may prevent clogging of the filter and not lower or loose its ability of reclaiming the filter due to the oil and water in the filter.

The method of the invention uses a self-reclaiming dust collector which may reclaim its dust collection ability by removing the dust with the dust removing device which is arranged in the filter while the gas flows from the inside of the filter to the outside thereof by forming in a cylindrically shaped filter having a vertical axis. Therefore, it is not necessary to provide a big cleaning device with reverse flow for reclaiming the filter, and it becomes possible to make a small, compact apparatus.

Advantages

The apparatus according to the invention provides the liquid separation device for removing any oil and water from the gas which is introduced from the source which generates the fine particle dust. The dust collector provides the filter formed in a cylindrical shape, the cleaning chamber formed around the filter, the box-like body surrounding the filter and the cleaning chamber and having the introducing inlet for introducing the gas from the liquid separation device to the inside of the filter, and the introducing outlet for communicating the cleaning chamber with the outside, the dust removing device rotatable along the inner wall of the filter, and the driving device for driving the dust removing device.

Thereby, the method of the invention can be carried out as follows. Namely, prior to introduction of the gas including the fine particle dust from the source which generates the dust to the dust collector, the oil and water are removed from the gas and the gas is filtered by flowing through the filter of the dust collector from the inside to the outside thereof, and by continuously rotating the dust removing device, the inner wall of the filter may be cleaned so as to remove the dust caught by the filter and the dust is collected.

In practicing the method of this invention, fine particle dust of less than 0.3 μm is effectively separated and removed from the gas for a long period of time, so that it may prevent harmful products from being distributed into the atmosphere.

Further, by practicing the method of this invention, it is not necessary to provide a big cleaning device with reverse pressure for the filter and therefore it may be a small compact apparatus.

In the apparatus of the invention, where the blower is provided for blowing the gas from the source which generates the dust to the outside via the liquid separation device and the dust collector, it becomes possible to effectively send the gas including the dust from the source which generates the dust to the dust collector. As the result, it becomes possible to increase the efficiency of collecting the fine particle dust.

Further, in the apparatus, the liquid separation device may provide a liquid separation chamber therein formed in a cylindrical shape having a vertical axis, a box-like body having an inlet formed with a lower portion of the liquid separation chamber for introduce the gas of the source which generates the fine particle dust, and having an outlet formed with an upper portion of the liquid separation chamber for discharging the gas to the dust collector, a liquid separation rotary brush in a disc or spiral shape is arranged between the inlet and the outlet of the liquid separation chamber to extend across the liquid separation chamber and rotatable about a vertical axis, and a driving device for driving the liquid separation rotary brush.

In the liquid separation device, in which it uses a liquid separation rotary brush in a disc shape, the following method can be practiced. Namely, the method comprises the steps of blowing the gas including the fine particle dust from the source which generates the same, from the underside of a liquid separation rotary brush which is rotated laterally, to the upper side of the liquid separation rotary brush so as to catch any oil and water between the bristles of the liquid separation rotary brush, transferring the oil and water, which are caught by the liquid separation rotary brush to the inner peripheral wall of a liquid separation chamber which is arranged around the liquid separation rotary brush by utilizing a centrifugal force, dropping the oil and water along the inner peripheral wall of the liquid separation chamber with gravity so that the same drops into a pool at the bottom of the liquid separation chamber, and introducing the gas to the dust collector which passes above the liquid separation rotary brush to the dust collector.

According to this method, a pressure loss of the gas due to the liquid separation rotary brush for separating the oil and water, and may permit the use of a small blower which has a flow capacity. As a result, the apparatus can be small and compact which results in lower installation cost as well as lower operating cost.

Further, in the apparatus, in which the liquid separation device includes a laminated member which is arranged at the bottom of the liquid separation chamber that is made of a water-absorbing polymer, an oil absorbing polymer or a combination thereof, in practice, the method includes absorbing the oil and water in the polymer and the oil and water together with the polymer is removed together. With this method, it becomes easy to collect the separated oil and water.

Furthermore, in the apparatus, where the lower portion of the liquid separation chamber is disassembled from the upper portion, the waste formed in a pool at the bottom of the separation chamber, together with the lower portion of the liquid separation chamber can be removed together to a treating place. This method increases safety since there is no need that the operator contact the waste at the time of transfer to its treating place.

Furthermore, in the apparatus, where the dust removing device of the dust collector comprises a dust removing rotary brush which comprises a spiral brush having bristles forming a spiral surface about a central axis positioned in an axis of the filter of the dust collector, it becomes possible to make the gas flow to the inside of the filter from the gas introducing side of the brush to the opposite side by rotating the spiral brush by means of the driving device. As the result, it may practice the method by the gas flowing into the filter with an equal pressure against the entire filter area. As the result, a filtering function can be applied on the entire area of the filter so as to prevent the filter from clogging particularly due to the dust.

Furthermore, in the apparatus, where the dust removing device of the dust collector comprises a dust removing rotary brush which comprises a spiral brush having bristles forming a spiral surface about a central axis positioned in an axis of the filter of the dust collector, the spiral brush is moved in up and down direction by the driving device to sweep the inner wall of the filter. To practice the method, the fine particle dust can be brushed off from the spiral brush and the filter smoothly and effectively.

Further, in the apparatus, where the dust collector is arranged above the liquid separation device and the introducing inlet serves as the outlet of the liquid separation device, it may practice the method of dropping the dust from the dust collector to the liquid separation chamber so as to form a pool of the dust in the bottom of the liquid separation chamber. Thereby, a pressure loss, which is caused by separated dust and a pile of the dust between the liquid separation device and the dust collector, may be prevented. As the result, the apparatus can be small and compact which increases safety in transferring the collected dust to its treating place.

In the apparatus, where the filter of the dust collector comprises a laminated filter having at least three filters each of which has a smaller mesh from the inside to the outside thereof in order of the mesh, the minimum diameter of the dust to be caught becomes less than 0.3 µm by lapping over each of the layers of the filters, particularly the final layer filter which laps over the filter which is positioned before the final layer filter.

In this case, where the laminated filter comprises a first layer filter having a mesh of about 200 µm, a second layer filter having a mesh of 50–200 µm, and a third layer filter having a mesh less than the second layer filter but greater than 1 µm, the minimum diameter of the dust to be caught becomes about 0.01 µm.

Further, where the laminated filter of the dust collector comprises the three layer filters. The thickness of the laminated filter is more than 5 mm, and the thickness of the first layer filter shares 20–50% of the thickness of the laminated filter. Also, the thickness of the second layer filter shares 30–60% of the thickness of the laminated filter and the thickness of the third layer filter shares 1–25%. As the result, it may obtain not only a sufficient mechanical strength, but also a very good efficiency of removing the dust.

Other objects and advantages will be apparent from the description of the embodiments with reference to the drawings.

BRIEF DESCRIPTION OF THE DRAWINGS

The drawings show embodiments of the present invention in which.

DETAILED DESCRIPTION OF THE EMBODIMENTS

An embodiment of the invention is described in detail in the case that an apparatus for removing a fine particle dust includes a source 1 which generates a fine particle dust in the process of manufacturing semiconductor elements.

Figure 1:
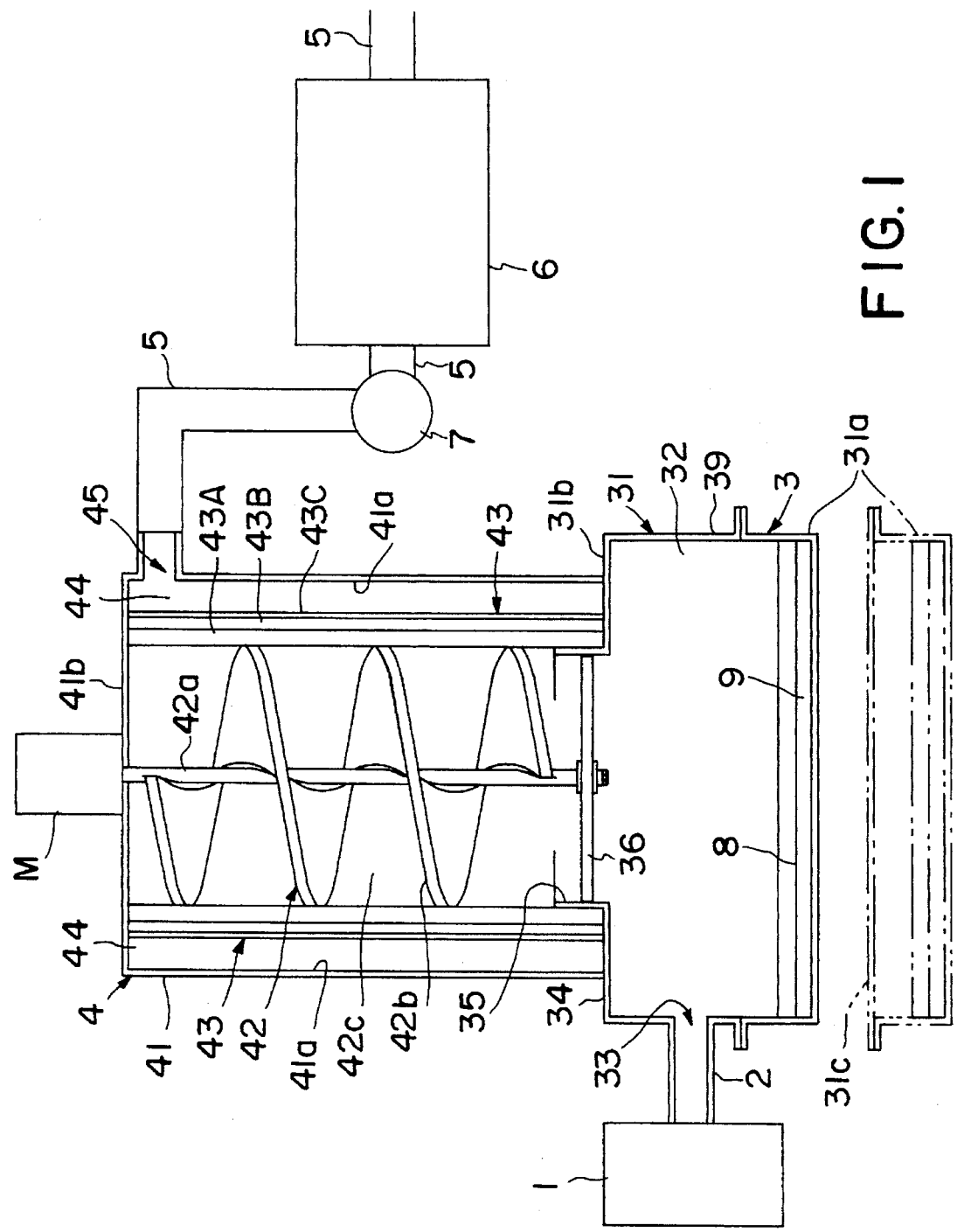
FIG. 1 is a constructive view of the apparatus.

As shown in FIG. 1, the apparatus for removing the fine particle dust provides a liquid separation device 3 which communicates with the source 1 of the dust in the process of manufacturing the semiconductor elements by means of an introducing duct 2, a self-reclaiming dust collector 4 connected to the upper portion of the liquid separation device 3, an exhaust duct 5 introduced from the dust collector 4, a harmful gas treating device 6 disposed in the exhaust duct 5, and a blower 7.

It is sufficient that the blower 7 discharges the gas in the air from the source 1 which generates the fine particle dust via the introducing duct 2, the liquid separation device 3, the dust collector 4, the harmful gas treating device 6 and the exhaust duct 5. For example, an intake duct is provided for introducing the air into the source 1 which generates the dust and the blower may be disposed in the intake duct or in the introducing duct 2, and in the liquid separation device 3 or the dust collector 4.

When the dust flow is to be discharged in the air from the source 1 which generates the dust via the introducing duct 2, the liquid separation device 3, the dust collector 4, the harmful gas treating device 6 and the exhaust duct 5, the fine particle dust generated by the source 1 and any oil and water entered into the flow from source 1 and then introduced to the liquid separation device 3 via the introducing duct 2, and then the oil and water as well as any relatively big particle dust are removed in the liquid separation device 3, as mentioned in detail hereinafter. Then, the gas is introduced to the dust collector 4 to remove the remaining fine particle dust.

The oil and water and the fine particle dust are removed from the gas which is discharged from the dust collector 4, but harmful materials are included therein. Therefore, the gas is introduced to the harmful gas treating device 6 and chemical treatments such as oxidation, reduction, neutralization are given thereto or an absorbing material such as active carbon or zeolite is used for treatment of the gas so as to clean the gas and discharge the same into the air.

The liquid separation device 3 provides a box-like body 31 and a liquid separation chamber 32 is formed in the box-like body 31 to be of a cylindrical shape having a vertical axis. An inlet 33 for communicating the liquid separation chamber 32 with the gas introducing duct 2, is formed with a portion of the box-like body 31 leaving a predetermined height from the lower end of the box-like body 31. An outlet 35 for connecting the liquid separation chamber 32 with the dust collector 4, is formed to open an upper wall 34 of the box-like body 31.

The material for forming the box-like body 31 is not limited. For example, it may use paper, wood, plastics and metal, but it is necessary to provide a mechanical strength, particularly a rigidity which sufficiently bears against the gas pressure.

In this embodiment, the box-like body 31 is formed with plastics which is superior in a mechanical strength, weather resistance, chemical resistance, acid resistance, alkali resistance and thermal resistance.

The shape of the box-like body 31 is not limited particularly, but it is preferably a hollow shape which may form the liquid separation chamber 32 therein. For example, it may be formed in the shape of a cubic, a rectangular parallelepiped, a cylinder, or an elliptical cylinder. To save manufacturing cost, it is preferable to take a shape as simple as possible.

In this embodiment, the following conventional structure means are used for forming the cylindrical box-like body 31. For example, bending of a flat plate, band-lay-up, splay-up, vacuum-bag forming, pressure-bag forming, auto-crepe forming, cold-press forming, squeeze forming, reservoir forming, injection forming, vacuum injection forming, and matched die forming. The size of the box-like body 31 may be designed in accordance with a predetermined volume of gas-dust flow per hour, and a changing cycle capacity of an oil-absorbing polymer 8 and a water-absorbing polymer 9, which are referred to hereinafter.

It is sufficient to form the liquid separation chamber 32 in the interior of the box-like body 31. It is possible to provide a partition wall in the box-like body 31 to divide the liquid separation chamber 32. In this embodiment. to simplify its construction and to aim at compactness, the box-like body 31 is constructed to form the peripheral wall of the liquid separation chamber 32.

The liquid separation device 3 provides a liquid separation rotary brush 36 of a discshape, which is arranged rotatably about a vertical axis while contacting with the inner wall of the liquid separation chamber 32 between the inlet 33 and the outlet 35, and a driving device M which serves as the driving device for the dust removing device of the dust collector 4, which in this embodiment comprises a dust removing spiral brush 42. and the liquid separation device 3 is so, constructed that the gas flowing up from the inlet 33 to the outlet 35 in the liquid separation chamber, may contact the liquid separation rotary brush 36 completely, which is rotated continuously.

The material of bristles of the liquid separation rotary brush 36 is not limited, but it may be selected from among those materials which are used ordinarily as bristles for a brush. For example, it may include natural or plastic fibers, or metal wires made of steel, brass, copper and a combination of these materials.

The length of the bristles of the liquid separation rotary brush 36 are not limited, but it is preferable to set the length within a range so that the tips of the bristles are spaced slightly away from the inner wall of the box-like body 31, or that the tips of the bristles are in contact with the inner wall of the box-like body 31.

When the tips of the bristles contact the inner wall, the inner wall of the box-like body 31 may be defaced. Therefore, metal wires are not preferable as the material of the bristles. Where the tips of the bristles are spaced from the inner wall of the box-like body 31, it is not preferable since the gas including the oil and water goes up between the liquid separation rotary brush 36 and the box-like body.

However, the extent that the tips of the bristles are slightly spaced from the inner wall of the box-like body, it is no problem, since rotation of the liquid separation rotary brush 36 forms a flow with a centrifugal force in a direction that stops the gas including the oil and water from going up between the brush 36 and the box-like body 31.

When the gas contacts the liquid separation rotary brush 36, the oil and water included in the gas are caught between the bristles of the rotary brush 36 and then separated from the gas. The oil and water caught by the liquid separation rotary brush 36 are transferred toward the peripheral wall 39 of the liquid separation chamber 32 with a centrifugal force due to a rotation of the liquid separation rotary brush 36, and then flow down toward the bottom of the liquid separation chamber 32 along the peripheral wall 39 due to gravity, and as a result the oil and water are pooled separately in the bottom due to the difference in specific gravity.

Further, a part of the particle dust included in the gas as well as the dust having a relatively large diameter, is also caught between the liquid separation rotary brush 36 or absorbed in the oil and water which 'stick, to the rotary brush 36, and then are transferred to the peripheral wall 39 of the liquid separation chamber 32 together with the oil and water, and then they flow down to the bottom of the liquid separation chamber 32.

The remaining fine particle dust is drawn by the dust collector 4 through the outlet 35 while floating in the gas which passes through the bristles of the liquid separation rotary brush 36.

Where the oil and water and a part of the dust are separated from the gas in such a manner by means of the liquid separation rotary brush 36, its pressure loss of gas flow becomes minimum at the time of liquid separation by the liquid separation rotary brush 36. Therefore, a small and lower capacity blower as the blower 7 may be used. As a result, the apparatus may be of a small, compact construction and its installation and running cost may be reduced.

In this embodiment, to easily carry out treatment of the oil and water waste for disposal, a laminated member made of a water-absorbing polymer 9, an oil-absorbing polymer 8 or a combination thereof is disposed desirably at the bottom of the liquid separation chamber 32, and the water or the oil or the both that flows down to the bottom of the liquid separation chamber 32 are absorbed in the polymer, and then the polymer is taken out from the liquid separation chamber 32 for disposal.

The manner of arranging the oil-absorbing polymer 8 or the water absorbing-polymer 92 at the bottom of the liquid separation chamber 32, is not limited particularly. Particularly, it may assume the following arrangement. For example, the polymer in the form of a granule or powder is laid on the bottom of the liquid separation chamber 32 in a suitable thickness. In this case, both of the polymers may be mixed and placed in the bottom, but it is preferable to separate and lay the oil-absorbing polymer 8 and the water-absorbing polymer 9 in layers, so that these can be disposed of separately.

Considering disposal by separating these polymers, it is preferable to integrate the oil-absorbing polymer 8 and the water-absorbing polymer 9 rather than using the oil-absorbing polymer 8 and the water-absorbing polymer 9 in the form of a granule, in order to increase efficiency of treatment of the waste in disposal. In such an integrated state, a porous body supporting the oil-absorbing polymer 8 or the water-absorbing polymer 9 and plastic combining the oil-absorbing polymer 8 or the water-absorbing polymer 9 may be used. Further, the form of such an integrated member is not limited particularly, but it is preferable to form them to be a film, sheet or plate so as to place the same on the bottom of the liquid separation chamber, in order to avoid a tendency that the apparatus becomes larger in size due to an increase in the volume of the liquid separation chamber.

The oil-absorbing polymer 8 used in this embodiment, is not limited particularly, but it is preferable that it absorbs the oil and holds it. It may use a conventional oil-absorbing polymer in this case.

Further, as the water-absorbing polymer 9 used in this embodiment, it is not limited particularly, but it is sufficient to absorb the water and hold it. It may use a conventional water-absorbing polymer.

In addition to this, the box-like body 31 is constructed to be disassembled at a lower portion 31a, which is lower than the inlet 33 of the box-like body 31, and which is separated from an upper portion 31b. When a predetermined amount of the oil and water or the dust has accumulated in the bottom of the liquid separation chamber 32, or when the laminated member of the oil-absorbing polymer 8, the water-absorbing polymer 9 or its combination has to be changed due to its absorption life cycle, the lower portion 31a of the box-like body 31 is disassembled, and then carried out to a sorting and treating place together with the water or oil or the polymer including the oil or water or the both the oil and water, and the dust. After disposal, new oil and water absorbing polymers 8 and 9 are set in the empty lower portion of the box-like body 31 and then the lower portion 31a is assembled to the upper portion 31b of the box-like body 31.

Further, with preparation of a plurality of lower portions 31a, it is possible to change the lower portion 31a of the box-like body 31, in which the collected oil, water and dust are contained, to another lower portion 31a, in which new oil and water absorbing polymers 8 and 9 are contained.

In this matter, it is not necessary for the operator to directly touch the oil and water absorbing polymers 8 and 9 or the laminated of these polymers, which absorb the harmful materials, so as to increase safety.

In this case, after disassembling the lower portion 31a of the box-like body 31 in which the collected oil, water and dust are contained, it is preferable to cover and seal the upper opening of the removed container with a lid 31c, in order to increase safety.

The dust collector 4 is connected directly to the liquid separation device 3 in this embodiment, in order to prevent a pressure loss due to a flow resistance from the liquid separation device 3 to the dust collector 4, caused by an accumulation of the dust which is separated from the gas between the liquid separation device 3 to the dust collector 4, and to make the apparatus small and compact and also to increase safety in carrying the collected dust to its treating place.

Namely, the dust collector in this embodiment provides, at the upper portion of the liquid separation device 3, a box-like body 41 of cylindrical shape having a vertical axis which is positioned coaxially with the box-like body 31, said box-like body 41 is provided with a lid, a dust removing spiral brush 42 which is positioned coaxially with the box-like body 41, and a cylindrical filter 43 which contacts the dust removing spiral brush 42 from the outside thereof.

Between the filter 43 and a peripheral wall 41a of the box-like body 41, a ring shaped cleaning chamber 44 is formed and at the upper portion of the box-like body 41, an outlet 45 is formed so that the upper portion of the cleaning chamber 44 communicates with the exhaust duct 5.

The underside of the box-like body 41 is covered with an upper wall 34 of the box-like body 31 of the liquid separation device 3. At the center of the upper wall 34, an outlet 35 of the liquid separation device 3 is provided to serve as an introducing inlet of the dust collector 4, and the outlet being circular aligns with an with an outline of the dust removing spiral brush 42.

The material forming the box-like body 41 is not limited particularly. It may for example be formed by paper, wood, plastic or metal, but it is necessary to have a mechanical strength such as rigidity which sufficiently bears against the pressure of the gas.

In this embodiment, the box-like body 41 is formed of plastic which is superior in mechanical strength, weather resistant, chemical resistant, acid resistant, alkali resistant and thermal resistant.

The box-like body 41 is hollow, so as to form a ring shaped cleaning chamber 44 between the filter 43 and the peripheral wall 41a of the box-like body 41, but it is sufficient that the filter 43 is formed in such a state that it continues in the peripheral direction or intermittently in the peripheral direction.

Namely, it is possible to form the box-like body 41 in the shape of a cubic, a rectangular parallelepiped, a cylinder, or an elliptical cylinder. To save manufacturing cost, it is preferable to choose a shape as simple as possible. Further, to form a continuous filter along a length of the cylindrical filter 43, it is preferable to form the cleaning chamber 44 around the filter 43. Then, this embodiment forms the box-like body as a cylinder having a lid.

The size of the box-like body 41 may be designed in accordance with a predetermined treating flow volume per hour, and with a capacity depending upon a changing cycle of the spiral brush 42 or the filter 43.

The dust removing spiral brush 42 provides a central axis 42a and brushes or bristles 42b are arranged to form a spiral, and a spiral passage 42c is formed between an alignment of the brushes 42b.

The material of the brushes 42b of the dust removing spiral brush 42 is not limited particularly, but it may be selected from among those materials which are used ordinary as bristles for a brush. For example, it may include natural or plastic fibers, or metal wires made of steel, brass and copper. In this embodiment, it is using plastic brushes for the dust removing spiral brush 42 in order to prevent defacing the inner wall of the filter 43 or the tips of the brushes over an extended period of time.

It is necessary that the length of the brushes of the dust removing spiral brush 42 is at least set to the extent that the tips of the brushes 42a may contact the inner wall of the filter 43 with a certain pressure. It is preferable to set the length of the brushes to the extent that the tips of the brushes 42a are bent or curved near the inner wall of the filter so as to fit along the inner wall of the filter for a certain length.

The central shaft 42a of the dust removing spiral brush 42 is connected to a driving device M which is mounted on the upper wall 41b of the box-like body 41. A lower end of the central shaft 42a is connected to the liquid separation rotary brush 36 of the liquid separation device and these brushes 42 and 36 are driven by the driving device M simultaneously in the same direction.

Since the alignment of the brushes 42b of the dust removing spiral brush 42 forms a spiral, when the brush 42 is rotated, the gas in the filter 43 may be lifted or lowered. While operating for dust collection, it is advantageous that the brush 42 is rotated in such a direction that the gas is lifted through the passage 42c from the introducing inlet so as to transfer the same to the whole area of the filter 43 with a constant pressure.

When the gas including the dust contacts the dust removing spiral brush 42, the dust is caught between the brushes 42b and transferred to the inner wall of the filter 43 by a centrifugal force. The fine particle dust floating in the gas, which does not contact the brushes 42b and goes through the passage 42c and reaches the inner wall of the filter 43, is caught by the filter since the gas goes through the filter 43 from the inside to the outside thereof.

The filter 43 is not limited particularly, but it is sufficient to catch dust of less than 0.3 μm. For example, it may be formed by felt having a thickness of about 1.5 mm to filter a minimum diameter of dust which can be caught.

However, in this embodiment the filter comprises more than three layers of filter, each having a mesh which decreases in size from the inside to the outside, in order to set the catchable minimum diameter of the dust to 0.01 μm.

It is sufficient that at least three layers be used for forming the filters 43 (laminated filter), single or double layers are not preferable since they cannot catch the fine particle dust having a diameter of 0.01 μm.

It is possible to catch relatively fine dust when a filter 43B or 43C having a smaller mesh is arranged upstream of the laminated filter 43, by utilizing the small mesh of the filter 43B or 43C. However, it is not preferable since such a filter of small mesh clogs soon and its life cycle becomes very short.

The size of mesh of each of the filters 43A, 43B and 43C of the laminated filter 43 may be determined considering its purposes, distribution of diameter of the dust and other conditions.

In this embodiment, a first layer filter 43A having a mesh of about 200 μm, a second layer filter 43B having a mesh of about 50–200 μm, and a third layer filter 43C having a mesh greater than about 1–50 μm are laminated.

Figure 2:
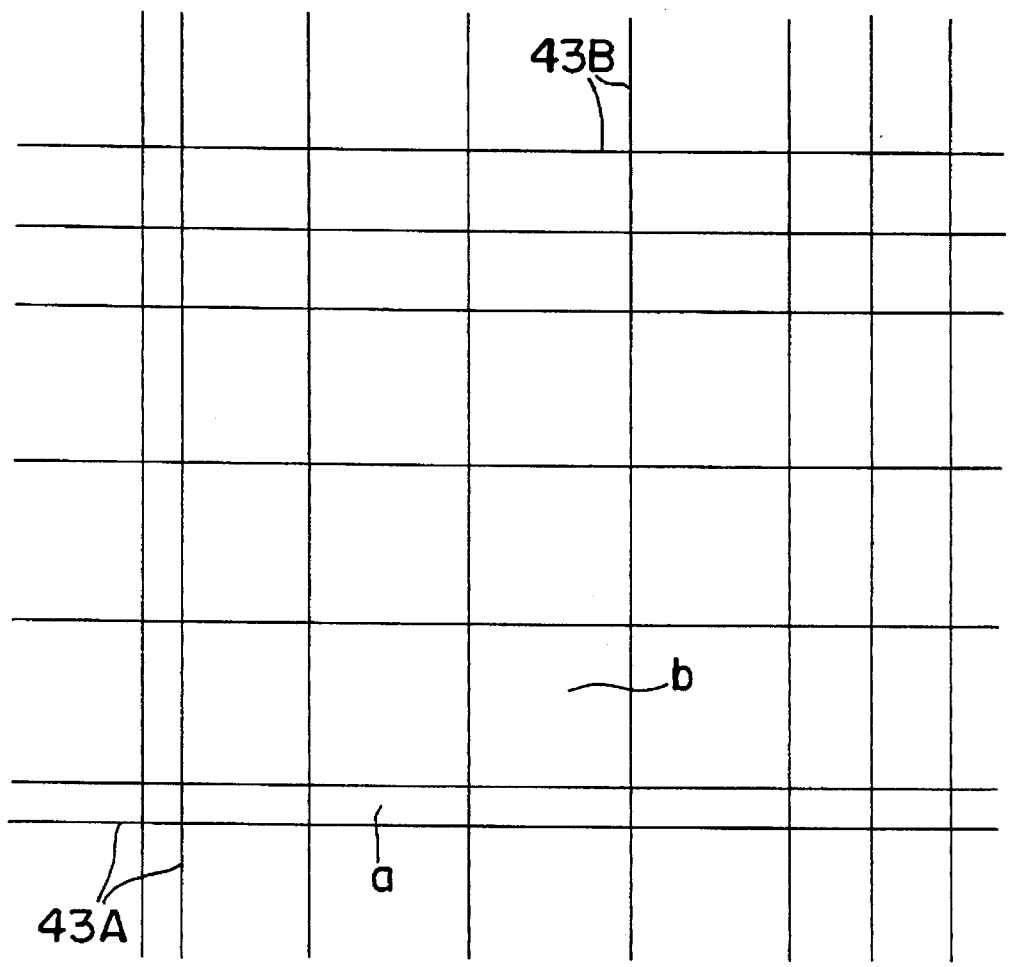
FIG. 2 is a schematic view showing a relationship between the first and second layer filters.

When the gas including the fine particle dust flows through the filter 43, the dust having a diameter greater than the mesh a set forth in FIGS. 2 of the first layer filter 43A is caught by the first layer filter 43A and the caught dust gradually spreads over the area of the mesh a of the first layer filter 43A.

As a result, the size of the mesh a of the filter 43A becomes small. However, provided that the dust is spherical and the mesh of the filter is square, and that the dust of the same size as the mesh a of the filter 43A is caught by the first layer filter 43A, the clogged mesh allows the dust of less than a size that it multiples the size of mesh by 0.01.

The value shows the theoretical limit of a diameter of the dust when the first layer filter 43A is clogged almost completely. However, if its pressure loss becomes large, the dust removing spiral brush 42 rotates to reclaim the laminated filter 43.

As shown in FIG. 2, at the boundary between the first layer filter 43A and the second layer filter 43B, the mesh a of the first layer filter 43A is separated by the mesh b shown in FIG. 2 of the second layer filter 43B which has a mesh smaller than mesh a. Further, a part of mesh b of the second layer filter 43B is separated by mesh a of the first layer filter 43A.

Therefore, the constant value of the mesh at the boundary between the first layer filter 43A and the second layer filter 43B becomes smaller than mesh b of the second layer filter 43B. As a result, a lot of the dust having a diameter smaller than the mesh b of the second layer filter 43B is caught at the boundary of the first and second filters. Then, the substantive size of the mesh at the boundary becomes relatively smaller than the mesh b of the second layer filter 43B.

The substantive size of the mesh at the boundary between the final filter (the third layer filter 43C) and the filter 43B, which is previously positioned next to the third layer filter, may be determined according to the number of layers of the filters 43A, 43B and 43c and also the size of each of the meshes a, b, c of the three filters. Thus, the limit of diameter of dust collection of the filter 43 is determined by the mesh of each of the three filters.

Actually, it is possible to produce only the final layer filter 43c having a mesh greater than 1 μm or less by suitably selecting the size of the mesh of the second layer filter 43B and the mesh of the final layer filter 43C or increasing the number of the layers of the filters.

The thickness of the laminated filter 43 may be determined considering the difference between the intake pressures of each of the source 1 which generates the dust and the blower 7, the permeability of the filter 43 and its pressure loss, and the mechanical strength of the filter 43. In this embodiment, it is set to be 5 mm.

The thickness of each of the filters 43A, 43B and 43C of the laminated filter 43 may be determined according to the difference between the intake pressures of each of the source 1 which generate the dust and the blower 7, permeability of each of the filters 43A, 43B and 43C and their pressure losses, and a mechanical strength of these filters. In this embodiment, the thickness of the first layer filter 43A shares 20–50% of the laminated filter. The thickness of the second layer filter 43B shares 30–60% of the laminated filter. The thickness of the third layer filter 43C shares 1–25% of the laminated filter.

The material of each of the filters 43A, 43B and 43C forming the laminated filter 43 is not limited,particularly. For example, it may use natural fibers, plastic fibers or a mixture of these, an extendable plastic film, foaming plastics, or porous ceramics. Where fibers are used, its texture may be knitted or woven texture of non-woven texture.

The natural fibers may be sorted to organic and inorganic fibers. As organic fibers, they may include, for example, a vegetable fiber such as cotton, rayon and pulp, and an animal fiber such as wool, cattle hide, pigskin, and horse hide or silk. Further, as inorganic natural fibers, they may include ceramic fibers such as glass fiber, rock wool and asbestos.

The plastic fibers may be sorted as organic fibers and inorganic fibers. Organic fibers may be polyamid fiber, acrylic fiber, polyester fiber, and acetate fiber. As inorganic fibers, they may be carbon fiber and boron fiber. However, as each of the fiber materials, it is preferable to use a material which does not react with the materials included in the gas and does not break down or corrode.

In this embodiment, the first layer filter 43A is formed such that polypropylene fibers having a thickness of about 4 mm are overlapping each other. The second layer filter 43B is formed such that polypropylene fibers having a thickness of about 3 mm are overlapping each other. The third layer filter 43C is formed such that polypropylene fibers having a thickness of about 1 mm are overlapping each other. Lamination of plural layers of the filters 43A, 43B and 43C means that each layer of the filter is arranged tightly to one another. However, it is not always necessary that the filters 43a, 43B and 43C are adhered to one another integrally by means of, for example, adhesion.

It is possible to reinforce the laminated filter 43 by a reinforcing member. The reinforcing member may include a punched plate and net made of metal and plastics. The reinforcing member may be fixed to any of the filters 43A, 43B and 43C of the laminated filter 43 by means of adhesion, bolts, rivets, or other engaging means. However, it may not be fixed to all of the filters.

The laminated filter 43 may be reinforced by means of impregnation with a resin. In this case, the resin may be impregnated in one of the filters 43A, 43b and 43C, the plural of filters or all of the filters 43a, 43B and 43C.

The particle fine dust stuck to the laminated filter 43 drops with gravity while the dust removing spiral brush 42 is rotated and in contact with the inner wall of the filter 43.

The dust removing spiral brush 42 may be rotated by the driving device M to drive it in a reverse direction at any suitable cycle or any time, so as to sweep the inner wall of the filter with the brushes 42b of the spiral brush 42 in an up-and-down direction. After a time necessary for brushing off the dust from the laminated filter 43 and the brush 42, the rotation of the brush is changed back to its original direction so that the pressure difference between the inside and outside of the filter 43 returns and an effective filtering function may also be initiated.

The inner wall of the laminated filter 43 is brushed off by the spiral brush 42 and reclaimed as the dust clogging the mesh is removed. The spiral brush 42 is also reclaimed since the brushes 42b or bristles are vibrated due to reaction with the filter when cleaning the inner wall of the laminated filter 43 and the dust held between the brushes 42B is brushed off.

In this embodiment, the spiral brush 42 is rotated continuously, removal of the dust by the spiral brush 42 and the laminated filter 43 and reclaiming of the spiral brush 42 and the laminated filter 43 may be carried out simultaneously and continuously, so that high efficiency of dust collection can be maintained for a long period of time.

The gas introduced in dust collector 4 is the gas from which the oil and water are removed; the oil and water and the dust are not stuck to the laminated filter 43. As a result, the oil and water do not permeate into the laminated filter 43 and clog the mesh of the filter, so that a high ability of dust collection may be maintained for a long period of time.

The dust brushed off from the laminated filter 43 and the spiral brush 42 falls down through the outlet 35 of the liquid separation device 3 which also serves as the introducing inlet of the dust collector 4, and finally onto the bottom of the liquid separation chamber 32, and pools together with the dust which is separated in the liquid separation chamber 32. Therefore, it is possible to carry out the dust separated by the dust collector 4 and the waste separated by the liquid separation device 32 to a sorting place or its treating place simultaneously so that the operator touches very little of the harmful products and increases safety.

In this embodiment, at the time of disposal of the collected dust in the bottom of the liquid separation device 3, to secure safety for a third person or any specific person against the harmful objects, it is possible to arrange a receptacle such as a bag in the lower portion 31b of the box-like body 31 for wrapping the dust collected in the bottom of the box-like body 31 and the laminated member of the oil-absorbing polymer 8 and the water-absorbing polymer 9.

Further, the central shaft 42a extends along an axis of the filter so that the liquid separation rotary brush 36 and the dust removing spiral brush 42 may be rotated in the same direction or in opposite directions by means of the common drive device M or an independent drive means.

Figure 3:
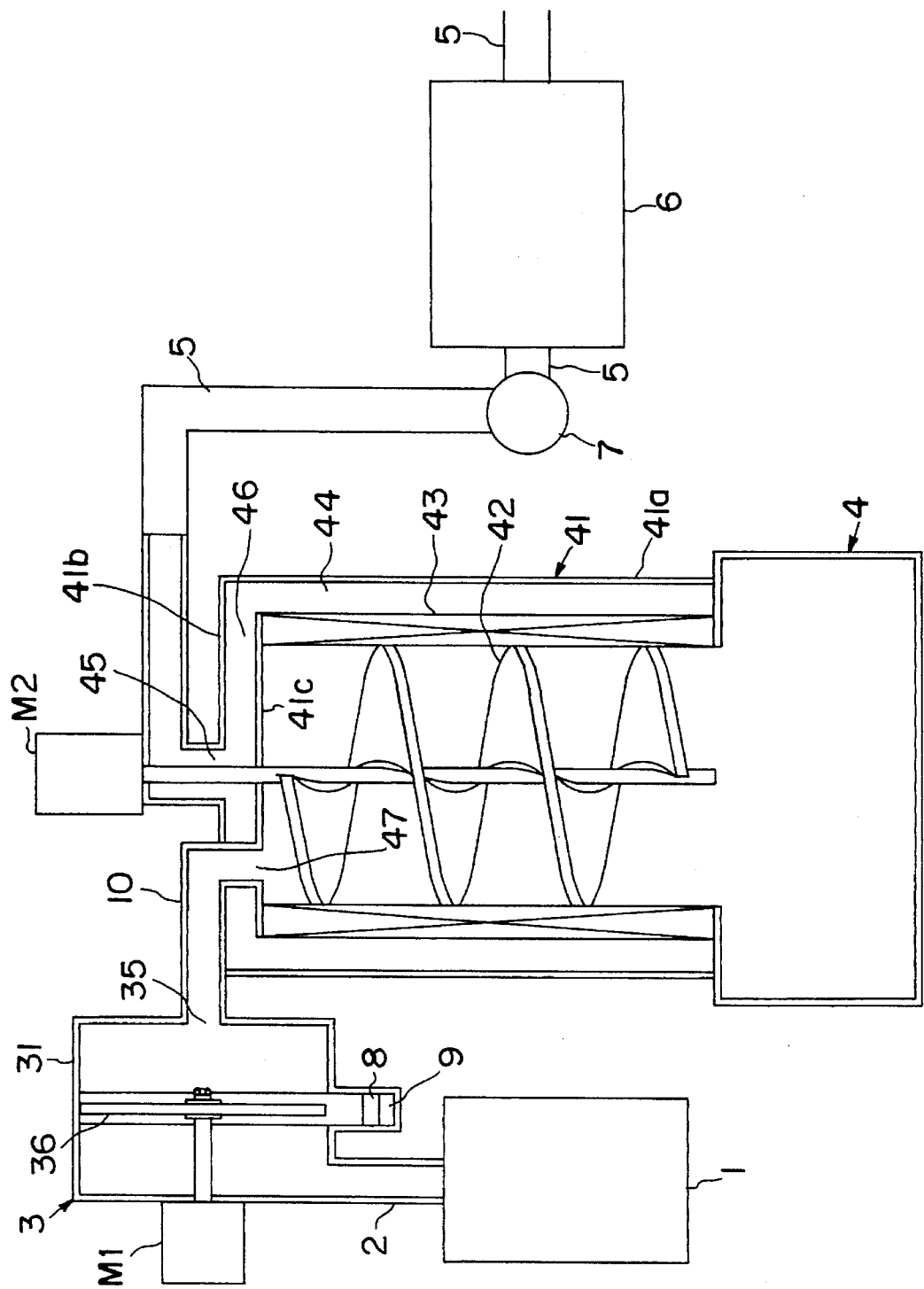
FIG. 3 is a constructive view showing a second embodiment of the apparatus.

Furthermore, as shown in FIG. 3, it is possible that the liquid separation device 3 and the dust collector 4 are constructed independently of each other and the outlet 35 of the liquid separation device 3 and the introducing inlet 47 of the dust collector 4 communicate with each other by means of the intermediate duct 10. In this embodiment, the drive device M1 for driving the rotary brush 36 of the liquid separation device 3 and the driving device M2 for driving the spiral brush 42 of the dust collector 4 are disposed independently of each other, but they may be driven by a common driving device which has a suitable transmission for operatively driving the liquid separation rotary brush 36 and the spiral brush 42.

Particularly, as shown in FIG. 3, a lid 41c is provided for covering the upper surface of the filter 43 or the hollow portion of the filter 43 by forming the lid independently of the upper wall 41b of the box-like body. A gathering chamber 46 is formed above the lid 41c for communicating with the cleaning chamber 44 which communicates with the outer periphery of the filter 43 equally. As a result, a passage resistance from the outer periphery of the filter 43 to the outlet 45 becomes equal in a peripheral direction by opening the outlet 45 at the center of the gathering chamber 46. Thus, by leveling the passage resistance from the outer periphery of the filter 43 to the introducing outlet 45 in a peripheral direction, the filtering efficiency of the filter 43 becomes equal in a peripheral direction.

Figure 4:
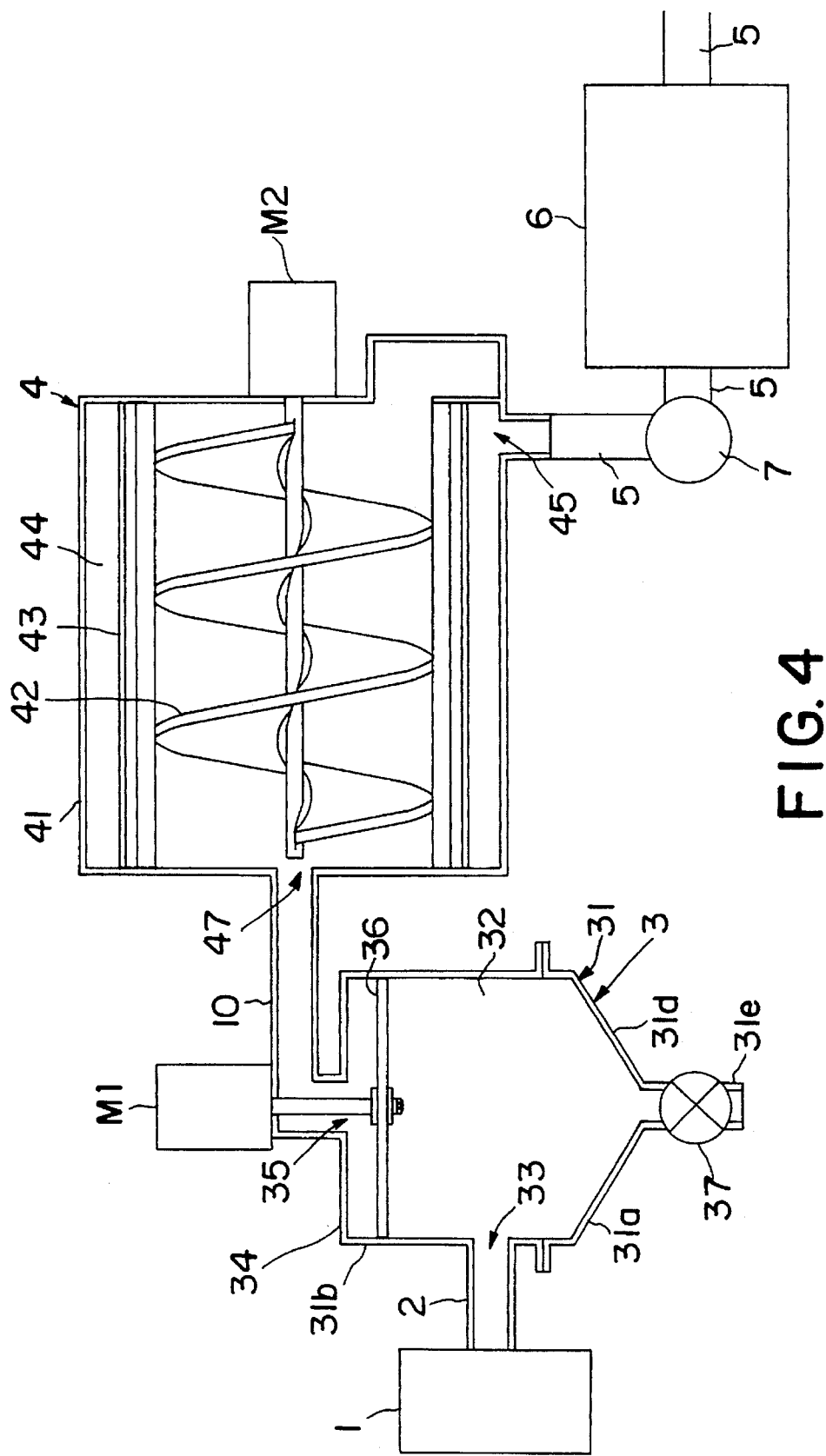
FIG. 4 is a constructive view of a third embodiment of the apparatus.
Figure 5:
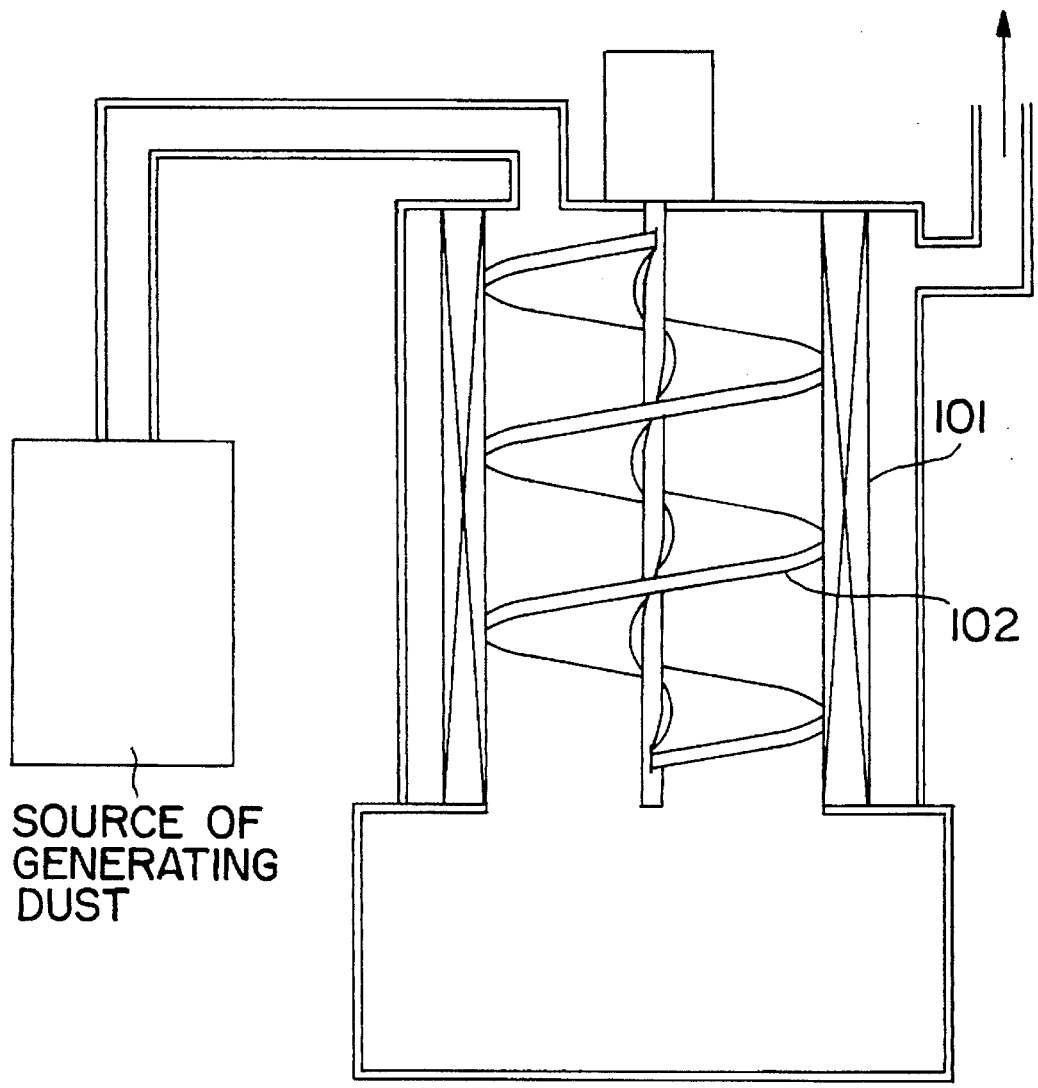
FIG. 5 is a constructive view of a prior art apparatus.

In addition to this, the box-like body 41 of the dust collector 4, the spiral brush 42 and the filter 43 are not limited to a vertical axis respectively, but it is possible to arrange their axis to be lateral, as shown in FIG. 4.

Further, in each of the embodiments, as shown in FIG. 4, it is possible to make the following construction. Namely, the bottom wall 31d of the liquid separation device 3 is formed to be a funnel and a take-out opening 31e is provided at the end of the funnel and a control 37 is provided at the take-out opening 31e. With operation of the control valve 37, the oil and water and dust collected in the liquid separation device 3 may be removed at any time.

In the above-mentioned embodiment, the dust removing device discloses the dust removing spiral brush 42 which may contact the inner wall of the filter 43 of the dust collector 4 and rotate at a fixed position. However, the invention is not limited to the embodiment shown and it is possible to use a liquid separation rotary brush of disc shape, a pallet for scraping the dust and the like, and then move these right and left or up and down while rotating the same, so as to remove the dust caught by the filter 43 and to collect the removed dust.

In this invention, where the liquid separation rotary brush or the pallet is formed in a spiral, the spiral may be formed continuously or intermittently to form a spiral.

As the source of generating the fine particle dust, the above embodiments refer to the process of manufacturing semiconductor elements which produce a great amount of fine particle dust, but the present invention is not limited to the source. For example, it may apply to the source of generating a fine particle dust in the plastics industry, resources industry, ceramics industry, powder metallurgy industry, cleanser industry, catalyzer industry, ferrite industry, color material industry, agricultural chemical industry, fertilizer industry, food industry, waste treating industry, biochemical industry, cosmetic industry, or medical and pharmaceutical industry.

The foregoing relates to preferred exemplary embodiments of the invention, it being understood that other variants and embodiments thereof are possible within the spirit and scope of the invention, the latter being defined by the appended claims.

What we claim is:

1. A method of separating and collecting fine dust particles from a gas containing an oil and water along with the fine dust particles that originated from a source which generates the fine dust particles, which comprises introducing the gas including the fine dust, oil and water to a filter of a dust collector, removing any oil and water from the fine dust particle gas prior to introduction of the gas including the fine dust particles to a dust collector after removing the oil and water and some dust particles from the gas flow, directing the gas from an inside of the filter of the dust collector of cylindrical form to an outside thereof so as to filter the fine dust particles from the gas, cleaning an inner wall of the filter in the dust collector by a dust removing device which is rotatable at a fixed position, rotatable in a direction right and left or movable up and down while it is rotated, and collecting and then removing the dust caught by the filter from the dust collector.

2. The method of claim 1, further comprising the step of:

cleaning the dust particles from the filter intermittently or continuously.

3. The method of claim 2, wherein the dust removing device is a rotary brush or a pallet.

4. The method of claim 3, further comprising the steps wherein the step of removing any oil and water from the fine particle dust gas includes:

flowing the gas containing the fine dust particles from the source of generating the same to an underside of a laterally rotatable liquid separation rotary brush, directing the gas from an upperside of the liquid separation rotary brush to catch any oil and water in the fine dust particle gas between the bristles of the liquid separation rotary brush, transferring the oil and water, which are caught by the bristles of the liquid separation rotary brush to an inner peripheral wall of a liquid separation chamber which is arranged around the liquid separation rotary brush utilizing the centrifugal force of said rotary brush, allowing the oil and water along the inner peripheral wall of the liquid separation chamber to drop into a pool at the bottom of the liquid separation chamber, and introducing any gas which passes above the liquid separation rotary brush to the dust collector.

5. The method of claim 3, further comprising the step of:

absorbing the separated oil and water into a laminated member which is disposed at the bottom of a liquid separation chamber wherein said laminated member is made of a water-absorbing polymer, an oil-absorbing polymer or a combination thereof, in order to dispose of the oil and water together with the polymer.

6. The method of claim 2, further comprising the steps wherein the step of removing any oil and water from the fine particle dust gas includes:

flowing the gas containing the fine dust particles from the source of generating the same to an underside of a laterally rotatable liquid separation rotary brush, directing the gas from an upperside of the liquid separation rotary brush to catch any oil and water in the fine dust particle gas between the bristles of the liquid separation rotary brush, transferring the oil and water, which are caught by the bristles of the liquid separation rotary brush to an inner peripheral wall of a liquid separation chamber which is arranged around the liquid separation rotary brush utilizing the centrifugal force of said rotary brush, allowing the oil and water along the inner peripheral wall of the liquid separation chamber to drop into a pool at the bottom of the liquid separation chamber, and introducing any gas which passes above the liquid separation rotary brush to the dust collector.

7. The method of claim 2, further comprising the step of:

absorbing the separated oil and water into a laminated member which is disposed at the bottom of a liquid separation chamber wherein said laminated member is made of a water-absorbing polymer, an oil-absorbing polymer or a combination thereof, in order to dispose of the oil and water together with the polymer.

8. The method of claim 2, further comprising the step of:

allowing the fine dust particles that fall from the dust collector to drop into the bottom of a liquid separation chamber and disposing of the same.

9. The method of claim 1, wherein the dust removing device is a rotary brush or a pallet.

10. The method of claim 9, further comprising the steps wherein the step of removing any oil and water from fine particle dust gas includes:

flowing the gas containing the fine dust particles from the source of generating the same to an underside of a laterally rotatable liquid separation rotary brush, directing the gas from an upperside of the liquid separation rotary brush to catch any oil and water in the fine dust particle gas between the bristles of the liquid separation rotary brush, transferring the oil and water, which are caught by the bristles of the liquid separation rotary brush to an inner peripheral wall of a liquid separation chamber which is arranged around the liquid separation rotary brush utilizing the centrifugal force of said rotary brush, allowing the oil and water along the inner peripheral wall of the liquid separation chamber to drop into a pool at the bottom of the liquid separation chamber, and introducing any gas which passes above the liquid separation rotary brush to the dust collector.

11. The method of claim 9, further comprising the step of:

absorbing the separated oil and water into a laminated member which is disposed at the bottom of a liquid separation chamber wherein said laminated member is made of a water-absorbing polymer, an oil-absorbing polymer or a combination thereof, in order to dispose of the oil and water together with the polymer.

12. The method of claim 1, further comprising the steps wherein the step of removing any oil and water from the fine particle dust gas includes:

flowing the gas containing the fine dust particles from the source of generating the same to an underside of a laterally rotatable liquid separation rotary brush, directing the gas from an upperside of the liquid separation rotary brush to catch any oil and water in the fine dust particle gas between the bristles of the liquid separation rotary brush, transferring the oil and water, which are caught by the bristles of the liquid separation rotary brush to an inner peripheral wall of a liquid separation chamber which is arranged around the liquid separation rotary brush utilizing the centrifugal force of said rotary brush, allowing the oil and water along the inner peripheral wall of the liquid separation chamber to drop into a pool at the bottom of the liquid separation chamber, and introducing any gas which passes above the liquid separation rotary brush to the dust collector.

13. The method of claim 1, further comprising the step of:

absorbing the separated oil and water into a laminated member which is disposed at the bottom of a liquid separation chamber wherein said laminated member is made of a water-absorbing polymer, an oil-absorbing polymer or a combination thereof, in order to dispose of the oil and water together with the polymer.

14. The method of claim 1, further comprising the step of:

allowing the fine dust particles that fall from the dust collector to drop into the bottom of a liquid separation chamber and disposing of the same.

15. A dust collector apparatus for removing fine dust particles of a gas containing the fine dust particles introduced from a source which generates the fine dust particles, said apparatus comprising:

a gas introducing inlet for introducing the gas into a liquid separation chamber;

a liquid separation chamber that is capable of removing any oil and water from the gas introduced to the liquid separation chamber from the source which generates the fine dust particles, a dust collector comprising a cylindrical filter (43), a cleaning chamber (44) formed around the cylindrical filter, a cylindrical body (41) surrounding the filter and the cleaning chamber, an introducing inlet for introducing the gas from the liquid separation chamber into an opening of the filter, and an introducing outlet for communicating the cleaning chamber with an outside of said liquid separation chamber, a dust particle removing device rotatable in the cleaning chamber in contact with an inner wall of the filter, and a driving device for driving the dust particle removing device.

16. The apparatus of claim 15, wherein said liquid separation chamber comprises a liquid separation rotary brush which is disc or spiral shaped.

17. The apparatus of claim 16, further comprising a blower positioned relative to said cylindrical body which generates a flow of air to move the dust particles from the source which generates the fine dust particles to the outside of the cylindrical body via the dust collector.

18. The apparatus of claim 16, wherein said a cylindrical liquid separation chamber comprises a cylindrical shape having a vertical axis, a lower portion and an upper portion, a cylindrical body having an inlet formed in said lower portion of the liquid separation chamber for introducing the gas from the source which generates the fine dust particles, an outlet formed in said upper portion of the liquid separation chamber for discharging the gas to the dust collector, a liquid separation rotary brush arranged between the inlet and the outlet of the liquid separation chamber which is rotatable about said vertical axis, and a driving device for driving the liquid separation rotary brush.

19. The apparatus of claim 16, further comprising a laminated member arranged at the bottom of the liquid separation chamber, which member is made of a water-absorbing polymer, an oil-absorbing polymer or a combination thereof.

20. The apparatus of claim 16, wherein the lower portion of the liquid separation chamber is formed to be disassembled.

21. The apparatus of claim 15, further comprising a blower positioned relative to said cylindrical body which generates a flow of air to move the dust particles from the source which-generates the fine dust particles to the outside of the cylindrical body via the dust collector.

22. The apparatus of claim 21, wherein said a cylindrical liquid separation chamber comprises a cylindrical shape having a vertical axis, a lower portion and an upper portion, a cylindrical body having an inlet formed in said lower portion of the liquid separation chamber for introducing the gas from the source which generates the fine dust particles, an outlet formed in said upper portion of the liquid separation chamber for discharging the gas to the dust collector, a liquid separation rotary brush arranged between the inlet and the outlet of the liquid separation chamber which is rotatable about said vertical axis, and a driving device for driving the liquid separation rotary brush.

23. The apparatus of claim 21, further comprising a laminated member arranged at the bottom of the liquid separation chamber, which member is made of a water-absorbing polymer, an oil-absorbing polymer or a combination thereof.

24. The apparatus of claim 21, wherein the lower portion of the liquid separation chamber is formed to be disassembled.

25. The apparatus of claim 15, wherein said a cylindrical liquid separation chamber comprises a cylindrical shape having a vertical axis, a lower portion and an upper portion, a cylindrical body having an inlet formed in said lower portion of the liquid separation chamber for introducing the gas from the source which generates the fine dust particles, an outlet formed in said upper portion of the liquid separation chamber for discharging the gas to the dust collector, a liquid separation rotary brush arranged between the inlet and the outlet of the liquid separation chamber which is rotatable about said vertical axis, and a driving device for driving the liquid separation rotary brush.

26. The apparatus of claim 25, further comprising a laminated member arranged at the lower portion of the liquid separation chamber, which member is made of a water-absorbing polymer, an oil-absorbing polymer or a combination thereof.

27. The apparatus of claim 25, wherein the lower portion of the liquid separation chamber is formed to be disassembled.

28. The apparatus of claim 15, further comprising a laminated member arranged at the bottom of the liquid separation chamber, which member is made of a water-absorbing polymer, an oil-absorbing polymer or a combination thereof.

29. The apparatus of claim 15, wherein the lower portion of the liquid separation chamber is formed to be disassembled.

30. The apparatus of claim 15, wherein the dust removing device comprises a dust removing rotary brush which comprises a spiral brush having bristles forming a spiral surface about a central axis of the filter, and the spiral brush is rotated by the driving device.

31. The apparatus of claim 15, wherein the dust removing device comprises a central axis of the filter and a rotary brush including bristles extending along the central axis, so that the bristles contact an inner wall of the filter and remove the dust with rotation of the rotary brush by means of the driving device.

32. The apparatus of claim 15, wherein the introducing inlet of the dust collector is arranged above the liquid separation chamber and formed to serve as an outlet therefrom.

33. The apparatus of claim 15, wherein the filter comprises a laminated filter having at least three layers, each of which has a smaller mesh from the inside of the filter to the outside thereof in order of the mesh, whereby such a laminated filter effectively removes the fine dust particles.

34. The apparatus of claim 33, wherein the first layer has a mesh of about 200 μm, the second layer has a mesh of about 50–200 μm, and the third layer has a mesh less than the second layer filter but greater than 1 μm.

35. The apparatus of claim 33, wherein the thickness of the laminated filter is more than 5 mm, the thickness of the first layer filter shares 20–50% of the thickness of the laminated filter, the thickness of the second layer filter shares 30–60% of the thickness of the laminated filter, and the thickness of the third layer filter shares 1–25%.

* * * * *